United States Patent
Olson (10) Patent No.: US 6,611,769 B2
(45) Date of Patent: Aug. 26, 2003

(54) METER REGISTER WITH PROGRAMMING AND DATA PORT AND METER INPUT RESOLUTION FACTOR

(75) Inventor: John A. Olson, Brookfield, WI (US)

(73) Assignee: Badger Meter, Inc., Milwaukee, WI (US)

( * ) Notice: Subject to any disclaimer, the term of this patent is extended or adjusted under 35 U.S.C. 154(b) by 0 days.

(21) Appl. No.: 09/835,252

(22) Filed: Apr. 13, 2001

(65) Prior Publication Data

US 2003/0028333 A1 Feb. 6, 2003

(51) Int. Cl.$^7$ ................................................. G01F 1/08
(52) U.S. Cl. ............................. 702/45; 73/275; 73/861; 73/861.03; 73/861.77; 307/116; 324/142; 340/605; 340/606; 370/346; 702/100
(58) Field of Search ................. 702/45, 46; 73/861.77, 73/861.78; 324/76.77, 158.1; 340/870.02, 870.03; 235/95 R (56) References Cited

U.S. PATENT DOCUMENTS

| | | | |
|---|---|---|---|
| 4,306,457 A | * 12/1981 | Fukui et al. ............. 73/861.77 |
| 4,443,716 A | * 4/1984 | Avery ......................... 307/116 |
| 4,848,164 A | * 7/1989 | Quarve et al. ............ 73/861.77 |
| 4,868,566 A | 9/1989 | Strobel et al. ......... 340/870.03 |
| 4,887,469 A | 12/1989 | Shoptaw ....................... 73/275 |
| 5,046,369 A | * 9/1991 | Boyd et al. ............... 73/861.03 |
| 5,051,920 A | * 9/1991 | Reams et al. .................. 702/45 |
| 5,243,338 A | 9/1993 | Brennan, Jr. et al. ... 340/870.02 |
| 5,251,149 A | * 10/1993 | William ........................ 702/46 |
| 5,252,967 A | 10/1993 | Brennan et al. ....... 340/870.02 |

(List continued on next page.)

FOREIGN PATENT DOCUMENTS

| | | |
|---|---|---|
| DE | 297 15089 U1 | 9/1998 |
| EP | 57192828 | 11/1982 |
| EP | 0 121 734 A1 | 10/1984 |
| GB | 2 100 036 A | 12/1982 |
| JP | 06-282790 | 10/1994 |
| JP | 08-251673 | 9/1996 |
| JP | 11-086173 | 3/1999 |
| JP | 11-219491 | 8/1999 |
| WO | WO 00/03209 | 1/2000 |

OTHER PUBLICATIONS

Scampy :Hydrometer—For Models 742/74; Data Sheet Electronic Water Meters : 2/97.

Internet spec. pages from Hydrometer website: dated Oct. 26, 2000 (3 pages).

*Primary Examiner*—John Barlow
*Assistant Examiner*—John H Le
(74) *Attorney, Agent, or Firm*—Quarles & Brady LLP (57) ABSTRACT

An electronic, programmable meter register (10) includes an input section (18, 19, 30) for generating pulses in response to units of flow in a water meter, a stored control program (46), a microelectronic CPU (31) for executing the program (46) to read input pulses and to transmit output data representing units of flow volume. An output device (16) is responsive to output data from the CPU (31) to display units of flow volume, and the CPU (31) stores a programmable meter input resolution factor for a corresponding one of several meters that scales the output data that is transmitted to the output device (16). A magnet (49) is held outside the register unit (10), but in proximity to a reed switch (22) inside the sealed unit (10) to sequence the display (16) through a series of totalization, rate of flow and other screen displays. A magnetic pulse pickup (24, 18, 19) is provided to signal both forward and reverse flows.

36 Claims, 7 Drawing Sheets

U.S. PATENT DOCUMENTS

| | | | |
|---|---|---|---|
| D347,592 S | 6/1994 | Paese et al. | D10/99 |
| 5,376,776 A | 12/1994 | Paese et al. | 235/95 R |
| 5,433,118 A * | 7/1995 | Castillo | 73/861.77 |
| 5,469,049 A | 11/1995 | Briese et al. | 324/76.77 |
| 5,471,137 A | 11/1995 | Briese et al. | 324/158.1 |
| 5,537,029 A * | 7/1996 | Hemminger et al. | 3254/142 |
| 5,574,229 A * | 11/1996 | Castillo | 73/861.78 |
| 5,731,526 A * | 3/1998 | Kindrick | 73/861 |
| 5,920,265 A * | 7/1999 | Johnson et al. | 340/605 |
| 5,959,550 A | 9/1999 | Giles | 340/870.02 |
| 6,098,456 A | 8/2000 | Munck | 73/861.77 |
| 6,137,416 A * | 10/2000 | Meador | 340/606 |
| 6,246,677 B1 * | 6/2001 | Nap et al. | 370/346 |
| 2002/0035441 A1 * | 3/2002 | Ruesch et al. | 702/100 |

* cited by examiner

TOTALIZATION

FIG. 8

RATE OF FLOW

FIG. 9

METER IDENTIFICATION

FIG. 10

TEST MODE

FIG. 11 BACKFLOW

FIG. 12 SCALED PULSE RESOLUTION

FIG. 13 4 TO 20 RESOLUTION

FIG. 14 ALARM SCREEN

METER REGISTER WITH PROGRAMMING AND DATA PORT AND METER INPUT RESOLUTION FACTOR

TECHNICAL FIELD

The invention relates to the metering of water, gas and electricity, and more particularly to an electronic register for a water meter.

DESCRIPTION OF THE BACKGROUND ART

In the field of water meters, a turbine, nutating disc, a compound meter, or other type of flow measuring device is positioned in a housing that is connected in a water supply line. This is a "water meter". An instrument known as a "register" is disposed on the water meter, usually on top of the water meter in an enclosure of a type shown in Paese et al. U.S. Des. Pat. No. 347,592, issued Jun. 7, 1994. Inside the register enclosure is a device with a dial or an odometer, or both, for displaying a number of units of water, such as cubic feet or gallons, which has been consumed by a water utility customer. See, for example, the register described in Paese et al., U.S. Pat. No. 5,376,776, which discloses an odometer in a meter register.

It has been known to couple the movements of a water meter to a meter register by providing a moving magnetic element in the meter ("the wet side ") and a magnetic element in the meter register ("the dry side"). This allows the register to be mounted on the meter in a non-invasive fashion.

As disclosed in the above-mentioned prior art, meter registers have been largely mechanical devices, with the exception of a transducer for converting mechanical movements to electrical pulses, as disclosed in Strobel et al., U.S. Pat. No. 4,868,566.

One of the limitations of mechanical meter registers is that a different meter register must be manufactured for each respective meter, due to difference in size and flow range, wet side magnet resolution and desired unit of measure of the respective meters.

Advances in electronics have now suggested that an electronic meter register might be feasible. It is a general object of the invention to provide a meter register which, to the extent possible, replaces mechanical parts with electronics.

One of the technical problems in providing such an electronic meter register is that the totalizer is contained in a securely sealed glass and metal enclosure. A convenient method must be provided to initialize the meter register and reset it if necessary.

A further object of the present invention is to provide a single meter register that is non-invasive to the flow meter device and that will operate with many different types of water meters, thereby providing a meter register that is compatible with meters in a range of sizes.

A further object of the invention is to provide an electronic meter register with a service life comparable to a mechanical register.

SUMMARY OF THE INVENTION

The invention relates to a programmable, universal electronic meter register that will operate with meters of different sizes.

The invention more particularly includes a meter register having a stored control program, a microelectronic CPU for executing the stored control program for reading in pulses and outputting data representing units of flow volume, an output device responsive to output data from the CPU for outputting units of flow volume, an output device responsive to output data from the CPU for outputting flow rate, and in which the CPU stores a programmable meter input resolution factor for a corresponding one of several meters for scaling the output data that is transmitted to the output device.

The invention allows the user to specify resolution, which would not be possible with mechanical registers. Mechanical registers have a minimum resolution to the loading of the corresponding gear train. The register of the present invention is limited only by the resolution of the magnetic element transmitting pulses to the register.

The invention also relates to an electronic meter register having a novel magnetic sensor arrangement.

The input section comprises a pair of magnetically switched sensors on the dry side, and a rotating wet side magnetic element driven by the meter, which in a preferred embodiment, has two north poles and two south poles for generating eight switched events per revolution of the wet side magnet. Such an arrangement will sense negative flow, as well as positive flow.

The invention also relates to a universal electronic meter register having a communication interface to an external programmer which includes bidirectional lines for sending data to the programmer or receiving data from the programmer.

The meter register further comprises two lines for transmitting data to an external unit and receiving data therefrom. These lines are bidirectional when an external unit is performing programming functions for the meter register. The CPU is responsive to sense the connection of a 4-to-20 milliamp external power source through at least one other line to transmit data to the external unit.

The invention also relates to a universal electronic meter register having a novel, non-invasive control for reading a plurality of data screens through the glass portion of a sealed enclosure. An external magnet can brought into close proximity with a transparent cover, and without contacting it, be used to actuate a reed switch in the register to produce a sequence of screen displays.

The meter register further comprises a magnetically responsive switch electrically connected to the CPU and responsive to movement of an external magnet to cause the CPU to display a sequence of screen displays on the electronic visual display. The magnetically responsive switch is disposed inside a sealed meter register enclosure. The sealed enclosure includes a glass cover with a glass-to-metal seal with other parts of the enclosure.

Other objects and advantages of the invention, besides those discussed above, will be apparent to those of ordinary skill in the art from the description of the preferred embodiments which follow. In the description, reference is made to the accompanying drawings, which form a part hereof, and which illustrate examples of the invention. Such examples, however, are not exhaustive of the various embodiments of the invention, and therefore, reference is made to the claims which follow the description for determining the scope of the invention.

DETAILED DESCRIPTION OF THE PREFERRED EMBODIMENTS

Figure 1:
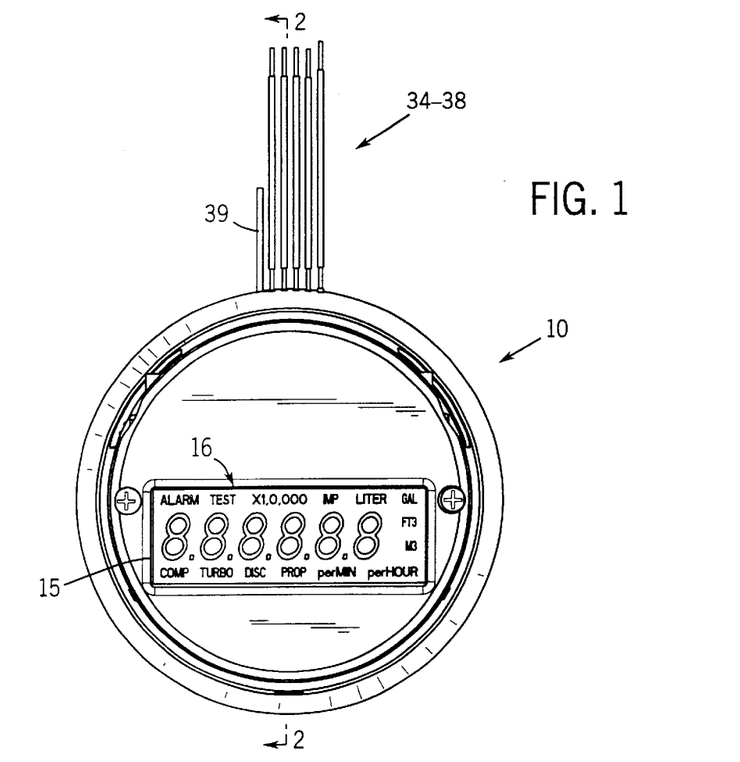
FIG. 1 is a top plan view of a preferred embodiment incorporating the present invention.
Figure 2:
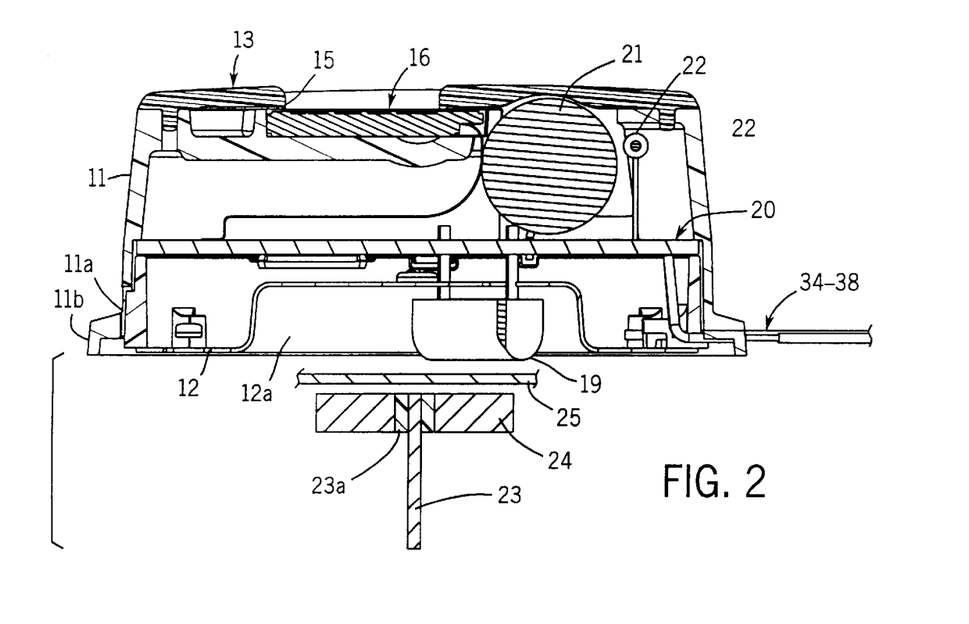
FIG. 2 is a sectional view taken in a plane indicated by line 2—2 in FIG. 1.
Figure 2A:
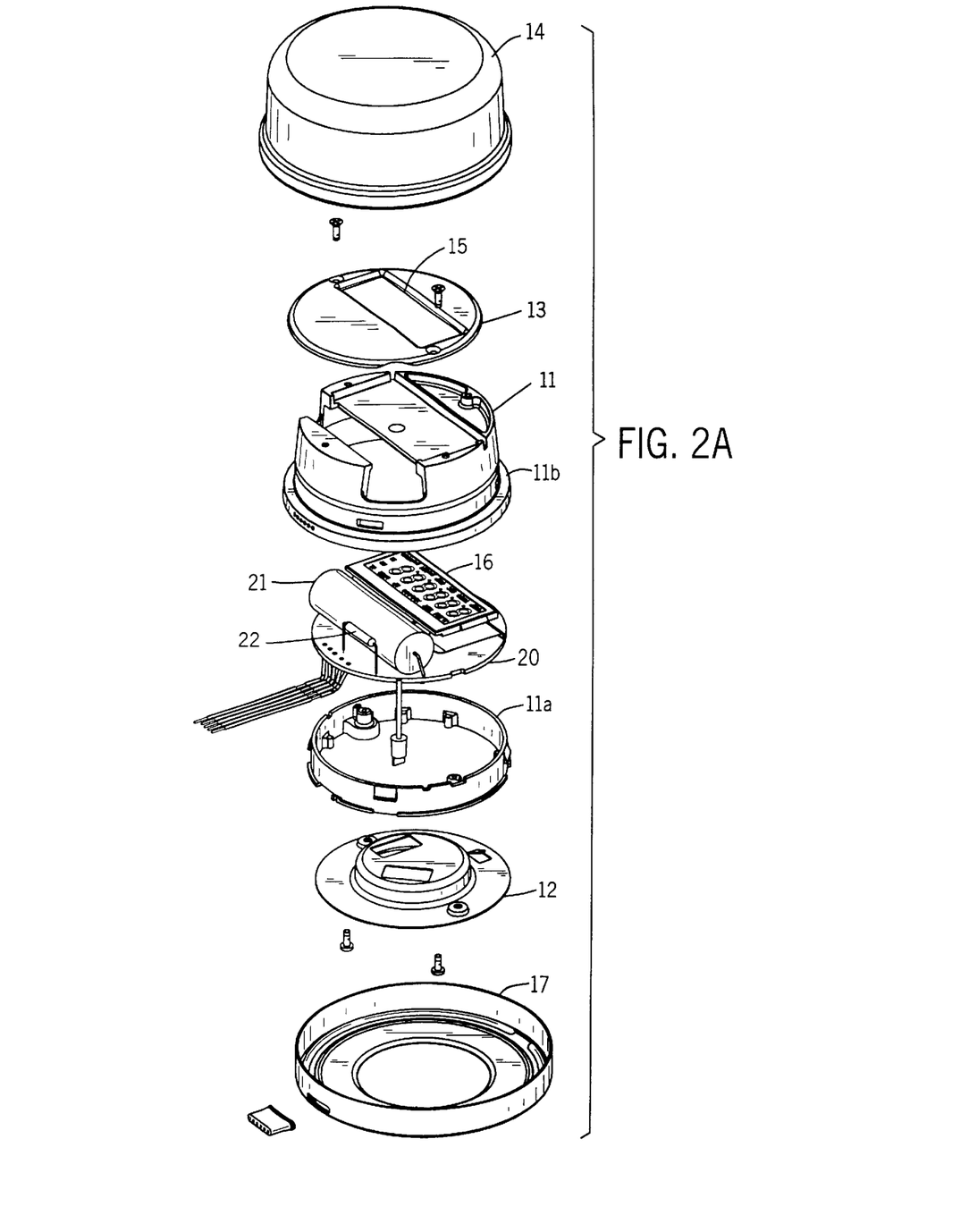
FIG. 2A is an exploded perspective view of the assembly of FIGS. 1 and 2.
Figure 3:
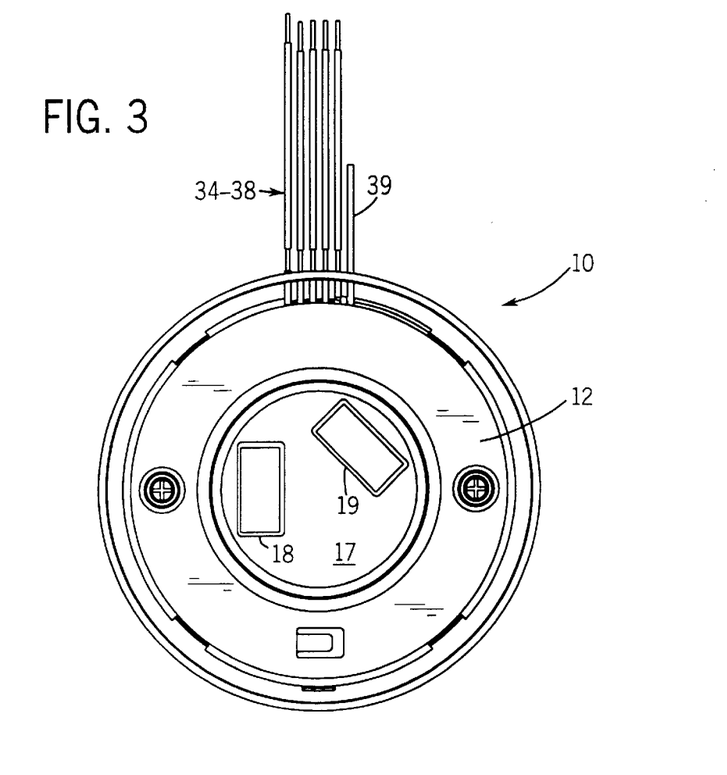
FIG. 3 is a bottom plan view of the embodiment of FIGS. 1, 2 and 2A.

FIGS. 1–3 illustrate an electronic meter register 10 of the present invention. The register 10 includes a chassis 11, a circuit board support member 11a and a base plate 12. The base plate 12 is formed of a magnetic shield material such as 1010 steel, for reasons to be explained below. A bezel 13 is mounted on top of the chassis 11 and has a window 15 for viewing an electronic visual display 16. A transparent cover 14 of glass or plastic (FIG. 2A) fits over the chassis 11 and bezel 13 and is sealed where it meets a rim 11b of the chassis 11 and a bottom cover plate 17 (seen in FIG. 2A) which is typically formed of copper or a copper alloy.

As seen in FIGS. 2 and 3, the bottom of base plate 12 has a depression which forms a cavity 12a. Two magnetically switched elements 18 and 19 are disposed in the cavity 17. Magnetically switched elements of this type are described in U.S. appl. Ser. No. 09/472,105, filed Dec. 27, 1999, and assigned to the assignee herein, where they are rotated past a pair of magnets. In the present invention, it is the magnets that are rotated past the magnetically switched elements 18 and 19. A second magnetically switched element 19 is disposed along a longitudinal axis at 135° with respect to a longitudinal axis of the first magnetically switched element 18. The magnetically switched elements 18 and 19 connect through wires to a circuit board 20 disposed horizontally in the register enclosure. As seen in FIGS. 2 and 2A, chassis 11 provides a shelf 16a for supporting the display 16. A battery 21 and a reed switch 22 are mounted on the top side of the circuit board 20. Also seen in FIGS. 1 and 3 are five insulated wires 34–38 for power and data, and a vent tube 39 which is used to evacuate the device before sealing.

Also seen in FIG. 2 is a magnetic element 24 on the meter. The magnetic element 24 is mounted on a rotating shaft 23, the element 24 having a central plastic insert for receiving an upper end of the shaft 23. The magnetic element 24 is rotated on a shaft 23, which in turn is rotated in response to flow through the meter. The magnetic element 24 is positioned under a top wall of a brass meter housing 25. The magnetic element 24 will generate pulses through rotation in proximity to the magnetically switched sensor elements 18 and 19. The sensor elements 18 and 19 are suspended by conductors which extend through openings in the base plate 12. The base plate 12 operates as a magnetic shield to shield the sensors 18, 19 from external noise from magnets other than the rotating magnetic element.

Figure 5:
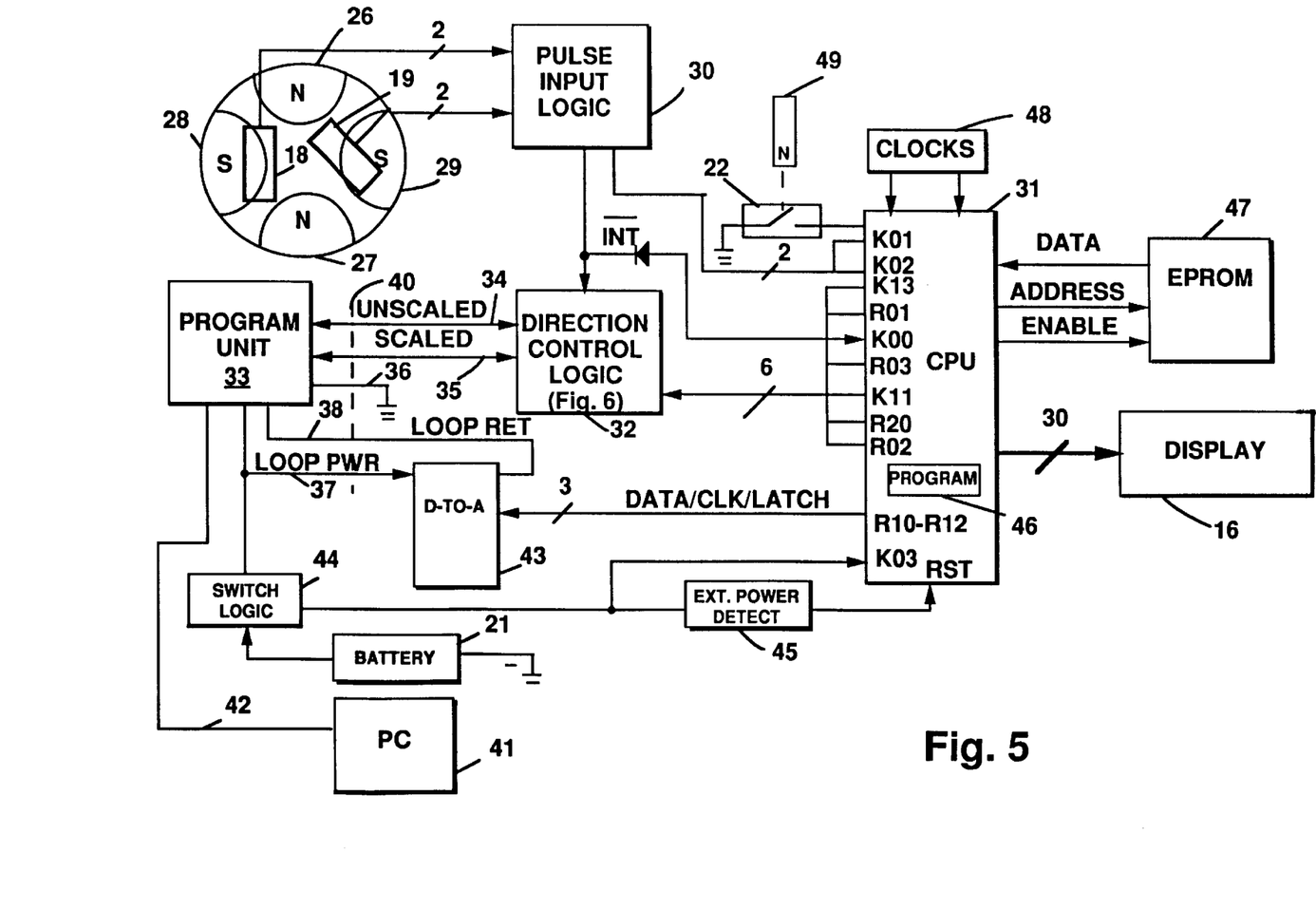
FIG. 5 is an electrical schematic of the circuitry contained in the apparatus of FIGS. 1–4.

Referring to FIG. 5, the magnetic element 24 has two north poles 26, 27 alternated with two south poles 28, 29. The poles are spaced ninety angular degrees around the edge of the round magnetic element 24. The magnetic element 24 rotates below the magnetically switched sensor elements 18 and 19 (FIG. 2). As it passes the sensor elements 18 and 19 pulses are generated to a pulse input logic circuit 30 (FIG. 5). Each time a magnetic pole passes one of the sensors 18, 19, a pulse is generated as explained in U.S. appl. Ser. No. 09/472,105, cited above. Two pulse trains are generated, one for each sensor 18, 19. The position of the sensor elements 18, 19, is such that the phase of one pulse train will be leading or trailing depending on the direction of rotation of the magnetic element 24. Therefore, this arrangement will detect positive and negative flow directions.

A pulse input logic circuit 30 originates digital signals in response to pulses from the sensor elements 18, 19 and transmits the digital signals to a microelectronic CPU 31 through a direction control logic circuit 32. The pulse input logic circuit 30 functions as a wired "OR" circuit to transmit an actuation signal on any one of four lines (two pairs of two lines seen in FIG. 5 for positive and negative pulses for each sensor 18, 19). One line in each pair of lines is a ground or return line. The direction control logic circuit 32 interfaces a program unit 33 through an interface connector 40, represented by the dashed line, to the circuitry in the meter register 10, particularly the CPU 31.

The program unit 33 connects to the meter register 10 through five lines 34, 35, 36, 37 and 38 also seen in FIGS. 1 and 3. These five lines are defined as follows:

34—unscaled output line: open collector output representing ⅛th of a revolution of the wet side magnet of the meter, also a DATA input/output line from the program unit 33 to CPU 31 when the program unit 33 is connected. The unscaled open collector output pulse has a duration of two milliseconds. Each time the device 10 senses a pulse from the sensors 18, 19 indicating flow in the forward direction, an unscaled output pulse is produced. No output pulse will result from back flow or from catch-up forward usage after back flow occurs. The number of unscaled output pulses should reflect the net forward totalization.

35—scaled output: open collector output representing a fixed (programmable) increment of flow volume from the meter. The scaled pulse is an output from the CPU 31, and is provided by a 2N7002 field effect transistor (FET) acting as the output device in the pulse input logic circuit 30. The scaled output is also a CLOCK line from the CPU 31 to the program unit 33 when the program unit 33 is connected. The resolution of the scaled output is programmable from 0.0001 to 9999 times the resolution of the display 16. The typical or default value is ⅒th the default display resolution of a particular meter. The pulse width of the scaled output is 35 milliseconds which is the pulse width for a piezoelectric pulse generator.

For a 2-inch Turbo II meter, the normal resolution is 100 gallons. The default output is 10 gallons which is 0.1 of the normal display resolution. The displayed quantities would be as follows.

| totalization | display in normal mode | display in test mode | output pulses |
| --- | --- | --- | --- |
| 0000002399.85750000 | 000023 × 100 GAL | 02399.8 GAL | 239 |

36—a digital ground common; and

37 and 38—4-to-20 milliamp output (2 lines, loop power, at least 6.5 volts, and loop return): an analog output standard in the industry where 4 mA represents no flow and 20 mA represents maximum flow, and the region between is a linear representation of flow rate.

The program unit 33 is an interface unit controlled by an external IBM-compatible PC 41 with a Windows 95/98/2000 operating system. This computer is connected to the program unit through an RS-232-C serial data link 42. This computer 41 maintains a database with parameters for the various meters that can be operated in conjunction with the meter register 10. The computer 41 has a programming application program to carry out the functions described herein.

The loop power line connects to an output on a D-to-A converter 43 and acts as an input to a switch logic circuit 44. The switch logic circuit 40 determines whether power is supplied to the meter register 10 from an external source, such as the program unit 33, or from the battery 21, seen previously in FIG. 1. Power is typically supplied by the battery 21 unless the program unit 33 or a 4-to-20 mA output device is connected. The CPU 31 also senses when loop power is connected. The CPU 31 connects through three lines to the D-to-A converter 43 to output a digital value which scales the loop power in the range of 4-to-20 milliamps. The power output from the switch logic circuit 44 also connects through an external power detect circuit 45 to signal the CPU 31 to reset when connected to the external program unit 33.

The CPU 31 is preferably an SMC621A dual-clock micro CPU available from Seiko of Japan. The CPU 31 is connected through typical DATA, ADDRESS and ENABLE lines to an EEPROM 47, which is preferably a 93LC46A/B 64×16 bit memory available from Microchip of Japan. The CPU 31 includes an on-board memory which stores a program of instructions 46 for directing the operations of the CPU 31. Programmed data parameters are stored in the CPU 31 and in the EEPROM memory 47. The EEPROM provides a non-volatile memory for storage of consumption data, for recovery in the event that the battery 21 fails or wears out. Data is read serially from this memory 47. The CPU 31 is driven by dual frequency clock signals from an clock circuit 48 of a type recommended for the above-mentioned CPU 31. The CPU 31 will sequence through execution of the program 46 in response to clock signals from clock circuits 48 and according to the programming logic contained in the control program 46. The CPU 31 is connected to a liquid crystal display 16 by thirty (30) data lines. The CPU 31 also has an input connected to a reed switch 22, also seen in FIG. 2, to detect switch closures and openings. The reed switch 22 changes state each time a magnetic actuator 49 in the form of a small wand with a magnet of either polarity (N or S) is brought near to it. The reed switch 22 is located inside the register chassis 11 (FIG. 2) and under the cover 14 (FIG. 2A), and the magnetic actuator 49 is non-invasive of the cover 14. The input signal from the reed switch 22 (FIG. 5) is sensed by the CPU 31 which controls sequencing of the eight screen displays or configurations seen in FIGS. 7 to 14, as will be further described below.

Figure 4:
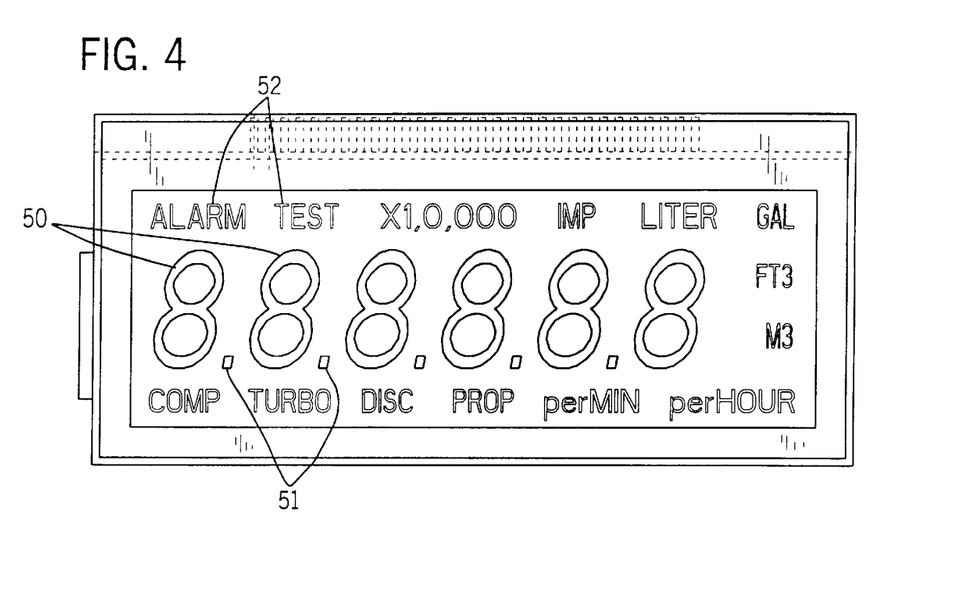
FIG. 4 is a detail view of a visual display seen in FIG. 1.

Referring to FIG. 4, the display 16 is a liquid crystal display that displays six decimal digits 50, five decimal points 51, and fourteen fixed on-off elements 52, also called annunciators, which form words or abbreviations. The X1,0,000 display is a special combination of seven on-off elements which depending on which are "on" or "off" provides multiplier values from X1 to X10,000 The alphanumeric display may use segments or pixel elements to display the digits 50. While an alphanumeric display is preferred, as most economical, in other embodiments a screen using pixel elements to display graphical images, as well as text, could also be used.

The on-off elements 52 are defined as follows:
ALARM—alarm screen designator,
TEST—test screen designator,
X1,0,000—multiplier values,
IMP—imperial gallon,
LITER—liter,
GAL—gallon,
FT3—cubic feet,
M3—cubic meter
COMP—compound-type meter,
TURBO—turbine-type meter,
DISC—disc-type meter,
PROP—propeller-type meter
perMIN—flow rate per minute, and
perHOUR—flow rate per hour.

The meter register 10 will display and transmit totalization, flow rate and meter specific information. The scaled output will represent an output quantity in terms liters or gallons, for example. The unscaled output will register a number of pulses. The register 10 can also be used to provide a 4-to-20 mA output. While the meter register 10 has been illustrated with a pair of magnetic sensors 18, 19, a single pulse generator at a remote location could be connected to the register 10 and provide any of the three types of metering pulse signals mentioned above. While the scaled and unscaled output can be operated with battery power, the 4-to-20 milliamp output will require an external source of power.

The meter register 10 can be used with a turbine, nutating disc or compound meter, or propeller type or other type of meter using a rotating magnet. The type of meter is displayed using the elements 52 on the visual display 16. The meter register 10 will sequence through eight screen displays illustrated in FIGS. 7–14 in response to eight movements of the magnetic actuator 49 into proximity with the reed switch 22.

Figure 7:
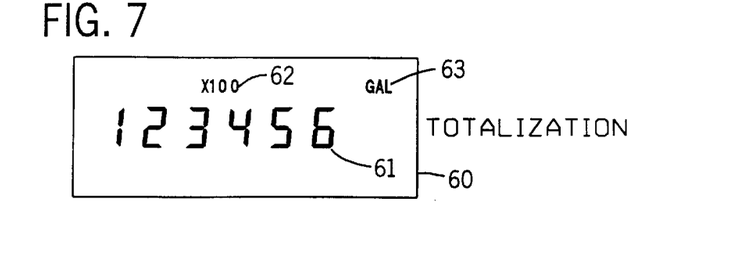
FIGS. 7–14 are detail plan views of the display as it is sequenced through various display modes.
Figure 8:
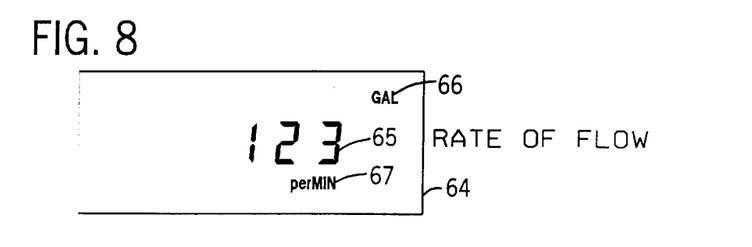

FIG. 7 shows a totalization screen display 60 in which consumption is shown by a six-digit number 61. A multiplier 62, such as x100, is also shown. Other possible multiplier values are x10, x1,000 and x10,000. A decimal point may also be used in the number, and the displayed number utilizes leading zeroes. A unit of measure 63 is also displayed, such as gallons (GAL), cubic feet (FT3), cubic meters (M3) or imperial gallons (IMP).

A rate of flow screen 64 (FIG. 8) is displayed next in the sequence. Rate of flow is shown as a six-digit number 65 without a multiplier. The unit of measure 66 (GAL, FT3, M3, IMP, L) is displayed with the corresponding time unit 67 (per MIN, per HOUR). The resolution of the flow rate will be determined by the multiplier value.

The flow rate is calculated using the pulses produced from the sensors 18, 19 or from a remote pulse transmitter. In the case of transmitters with unscaled or scaled outputs, the flow rate only needs to be calculated when necessary for the display. When the 4 to 20 mA option is used the flow rate calculation will have to be updated continuously (same update rate as the display would use 1 Hz).

The 4 to 20 mA option is continuously powered from an external source so that the CPU 31 can operate at the higher speed clock rate without reducing battery life. Leading zeros are not shown for rate of flow. A multiplier is not associated with flow rate. The units for flow are gallons, cubic feet, cubic meters, liters and imperial gallons while the time unit is minutes or hours. The flow unit of measure 66 will always be the same as the totalization unit. The lowest flow rate digit is dependent upon the totalization resolution and the size of the meter.

Figure 9:
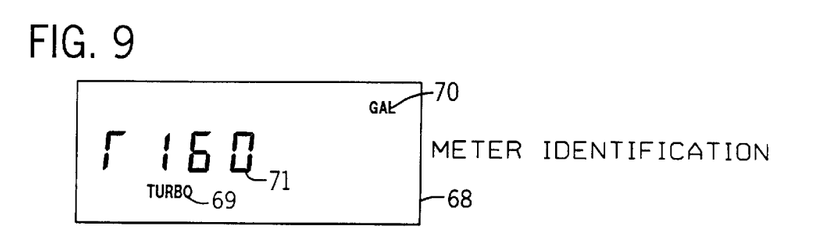

The next screen 68 to be displayed in the sequence is shown in FIG. 9. This screen display identifies the meter type 69, such as TURBO, DISC, PROP or COMP, the unit of measure 70 and provides an alphanumeric ID number 71 with as many as six digits.

Figure 10:
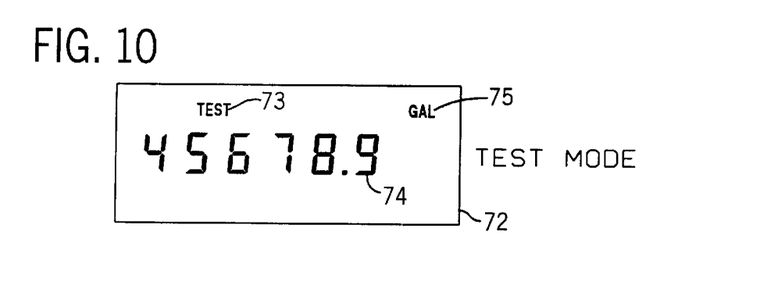

The next screen display 72 is shown in FIG. 10. This screen display is a test mode screen display. The screen is identical to the totalization screen, except for the "TEST" annunciator 73 and for resolution of the total number 74, which is one thousand times greater in the test mode. This is done by shifting the number in the display window three places and changing the multiplier annunciator accordingly. This will make it much easier to perform accuracy tests on the meter.

For example, if consumption is 12345678.9 gallons, the totalization screen would display 123456 X10 gallons (GAL) (with unit of measure indicator 75). In test mode the display would show "TEST" and the least significant digits 45678.9 for finer resolution.

Figure 11:
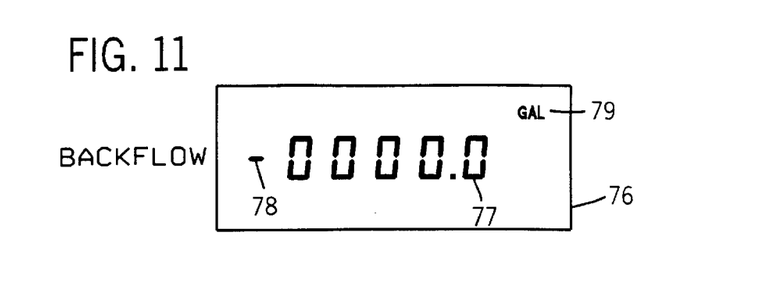

The next screen display 76 is shown in FIG. 11. This screen display 76 is a backflow screen display. This screen display 76 is identical to totalization except that it includes only five digits 77 preceded by a minus sign 78, and like the preceding screens includes a unit of measure indicator 79. Backflow totalization is displayed by showing only the lower order digits. The back flow totalization multiplier is in the high resolution mode, which is 1000 times greater than the normal mode.

Figure 12:
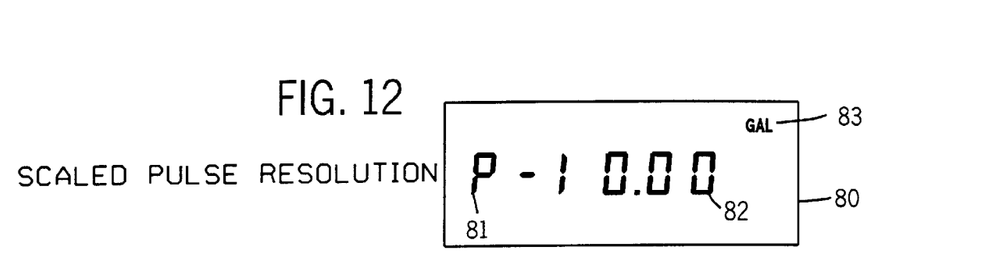

The next screen display 80 is shown in FIG. 12. This screen display 80 is a scaled pulse resolution screen display. This screen display shows a "P" 81 and a quantity 82 such as "10.00" and a unit of measure indicator (GAL) 83 reflecting the quantity of measure represented by each scaled output pulse.

Figure 13:
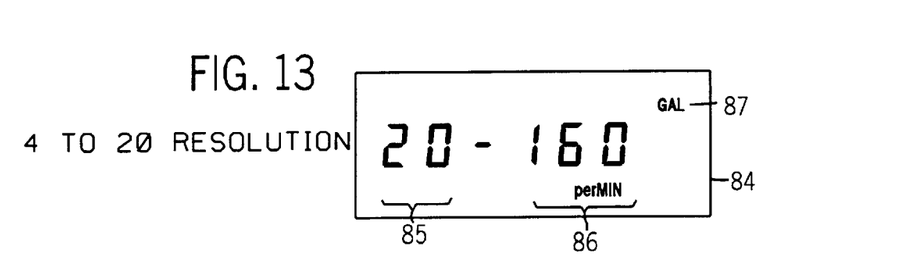

The next screen display 84 is shown in FIG. 13. This screen display 84 is a 4–20 milliamp scaled screen display. This screen display 84 shows a "20" corresponding to 20 milliamps and a quantity 86 corresponding to 20 milliamps to provide the scale of the range of the 4-to-20 milliamp output. A unit of measure 87 and flow rate parameter 91 are also provided.

Figure 14:
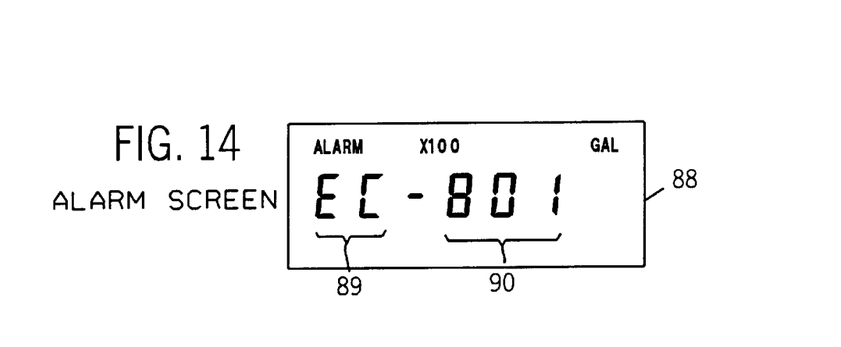

Lastly, FIG. 14 shows an alarm screen display 88, which includes display of an alarm annunciator 91 and an "EC" 89 followed by an alarm code of three digits 90.

The display will normally show the totalization display as seen in FIG. 7. The exception is in the case of an alarm condition. The sequencing to the other display screens is accomplished by bringing the magnetic actuator 49 in proximity to the reed switch 22 to produce a change of state of the switch which is sensed by the CPU 31, which then changes the information seen on the display 16. When the magnetic actuator 49 first switches the reed switch 22 from "off" to "on," the display 16 will show the meter identification display 64 (FIG. 8), absent an alarm condition. If an alarm occurs, the alarm screen display (FIG. 14) will be shown prior to the totalization screen and then a further actuation by the external magnet 49 will result in the display of the totalization screen display (FIG. 7).

The CPU 31 responds to a time-out period parameter to return the display to the totalization screen after a certain time. If the magnetic actuator 49 causes actuation of the reed switch 22 a second time, within that TOUT minute period, the rate of flow screen display (FIG. 8) will be shown. Successive actuations using the magnetic actuator 49 cause sequencing through the screen displays in FIGS. 7–13. At each successive display operation, a two-minute time-out will ensue. Once a time-out occurs at any display step, the display returns to the totalization display in FIG. 7. The CPU will be programmed to avoid inadvertent skips in the visual display. The totalization and flow rate information can be updated as the display is being viewed.

Referring again to FIGS. 2, 3 and 5, volume consumption information is based on pulses generated from the four pole meter magnet 24. Detection is performed by the pair of sensors 18, 19. The sensors 18, 19 detect flow in both a forward direction and a reverse direction based on the direction of rotation of element 24.

As an example, if the register 10 detects twenty forward pulses from the sensors 18, 19 and then the magnet 24 is driven in the reverse direction by negative flow to generate five (5) pulses, and then reverses direction again and then produces ten (10) pulses in the forward direction, the back flow totalization is five (5) pulses and the forward totalization is twenty-five (25) pulses. Any additional back flow would be added to the existing five pulses.

The meter poles are 90 degrees apart, while the sensors 18, 19 have their axes arranged 135 degrees apart, so that the leading and trailing relationship of two pulse trains detected by the pulse input logic circuit will indicate the direction of flow. Each sensor 18, 19 will detect actuation frequencies up to 100 Hz. As a result of using the two magnetic sensors 18, 19, the electronic system operates at input frequencies up to 200 Hz.

In the certain alternative embodiments, the pulse input logic circuit 30 may receive pulses from a single remote pulse input other than pulses from the magnet 24. The maximum remote input frequency is 200 Hz. It is also possible that these frequencies would be different in embodiments in which more or less than four poles are used on the wet side magnet 24.

The range of input frequencies the meter register 10 will use to determine flow rate varies greatly with the various meter sizes. The fastest input is 170 Hz from the Disc Model 15 disc-type meter and the slowest input is 0.05 Hz from the 12-inch Turbo II turbine-type meter. The damping in the display 16 must be programmable to adjust to the customer application. The programmable damping must allow for a stable flow rate at the low frequency rates for certain applications. In this worst case situation the meter would go up to twenty seconds without an input (time to zero). The meter would take twenty seconds to show a complete shutoff. For other situations a faster response would be necessary to show a valve closing.

The adjustment of the meter register parameters to operate with different meters will now be explained. The totalization display (FIG. 7) displays a six-digit number. These are the six most significant digits of totalization relative to the size of the meter. To account for small increments of consumption that a magnet pole of magnet 24 will represent, there are ten digits before the decimal and an additional eight digits after the decimal for a total of eighteen, not all of which are displayed in the totalization display 60 (FIG. 7). More digits would also be acceptable. The totaling of volume consumption is determined by counting pulses, each of which represents a scaled unit of consumption. This unit of consumption is defined for a specific meter by entering data for parameters in the following expression:

$$1)\ \frac{(\text{units/rev})}{(\text{pulses/rev})}$$

where:
   pulses/rev=number of input pulses per revolution of magnet 24 (2 sensors×4-pole magnet=8 pulses); and
   units/rev=volumetric consumption per revolution of the meter magnet.

As an example, if the meter is a 2-inch Turbo II meter available from the assignee of the present invention, this meter provides with 0.3693118 rev/gallon or 2.708 gallons/rev.

This meter has a 100 gallon multiplier. Assume that the meter is preset to a value of "23," signifying 2300 gallons due to the multiplier. If there are eight (8) pulses per revolution (2 sensors with a 4 pole magnet), the calculation of the above expression 1) for this meter is as follows:

$$\frac{(2.708\ \text{gallons/rev})*}{8\ \text{pulses/rev}} = .3385\ \text{gallons/pulse}$$

Some totalization readings for numbers of pulses would be tabulated and displayed as follows:

| input pulses | totalization | display |
|---|---|---|
| 0 | 0000002300.00000000 | 00023 × 100 GAL |
| 1 | 0000002300.33850000 | 00023 × 100 GAL |
| 2 | 0000002300.67700000 | 00023 × 100 GAL |
| 295 | 0000002399.85750000 | 00023 × 100 GAL |
| 296 | 0000002400.19600000 | 00024 × 100 GAL |

The displayed total is a truncated value rather than rounded as the example shows.

In the above example, after 295 pulses, the display will read 000023 X 100 GAL. In a higher resolution test mode the display will read 02399.8 GAL. There is an annunciator in the display sequence that shows the module to be in test mode.

The following will be an explanation of the function of the programming unit 33 and the operation of the bidirectional lines for handling scaled and unscaled pulses from the meter register, as well as CLOCK and DATA signals from the programming unit 33. All communication transactions begin with the programming unit 33 providing power through the loop power (LOOP PWR) line 37 and the loop return (LOOP RET) line 38. This causes the meter register 10 to change the scaled and unscaled output lines 34 and 35 to inputs lines for CLOCK and DATA signals.

Figure 6:
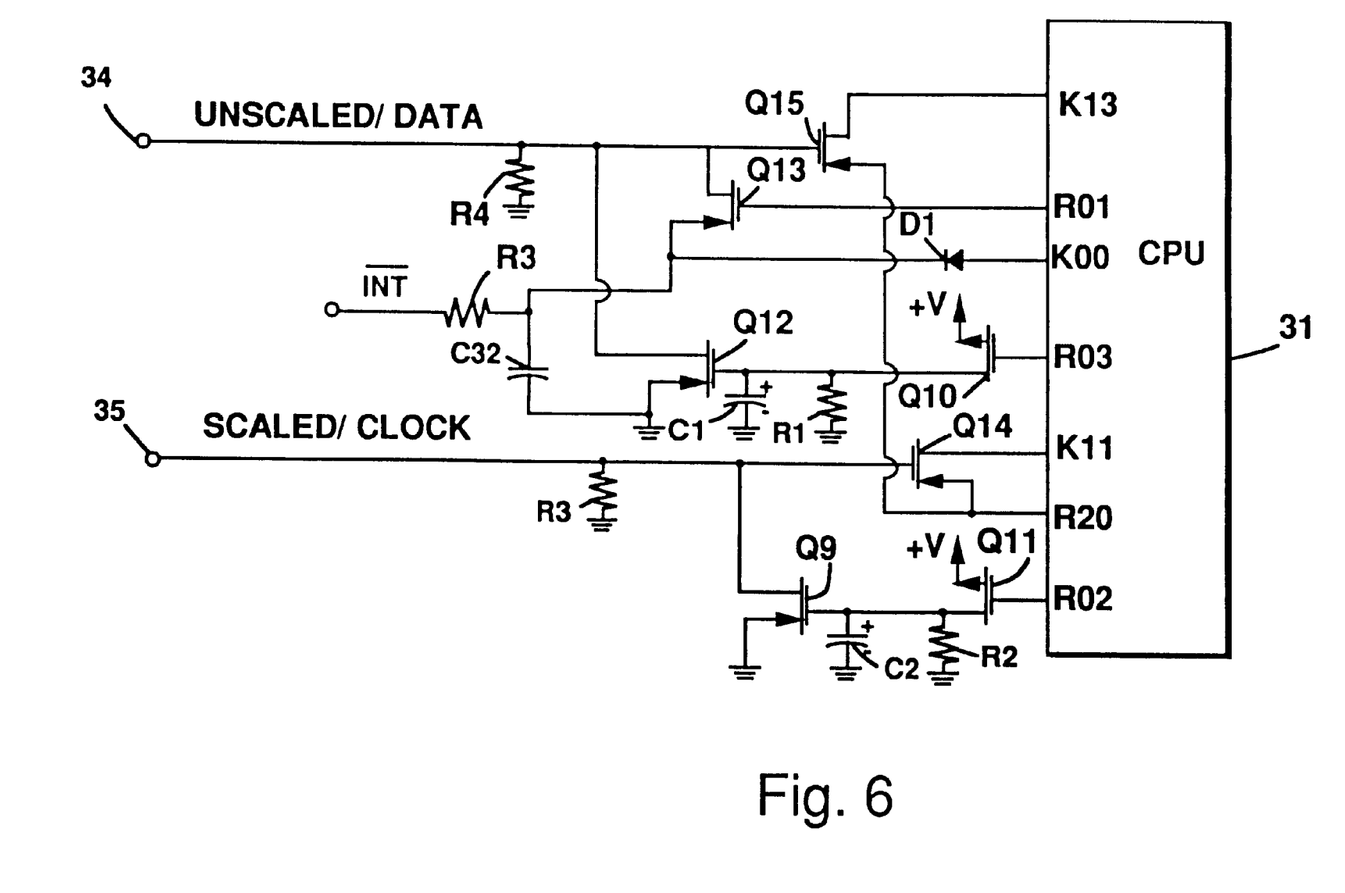
FIG. 6 is a detail electrical schematic of the direction control logic circuit seen in FIG. 5.

This is seen in more detail in relation to FIG. 6, which shows the details of the direction control logic circuit 32. The output terminal R02 controls the CLOCK/SCALED output line 35 and is used when the CPU 31 transmits data to the programming unit 33. The output terminal R02 is normally at a logic high state, so that field effect transistors Q9 and Q11 are off. When data is to be transmitted, R02 is switched to a logic low state, which turns "on" field effect transistors Q9 and Q11. Q9 is an open drain for the scaled pulse output from the pulse logic circuit 30. Output terminal R03 is used in the same way in relation to field effect transistors Q10 and Q12 in relation to the DATA/UNSCALED output line 34.

Output terminal R20 is normally in a logic high state. When data is expected from the programming unit 33, this terminal is pulled to a logic low state. This allows transistors Q14 and Q15 to be used as inputs. The input information from the programmer is read at terminals K11 and K13 of the CPU 31.

Q13 is used to activate the UNSCALED output line. The ~INT line is the pulse input. When the input occurs from one of the sensors 18, 19, a high-to-low transition (~INT) signal is generated and R01 is normally at a logic high and Q13 is turned on. Under that condition, the input pulse is conveyed on the UNSCALED output line 34. With R01 at a logic low, Q13 is turned off and an ~INT signal is input to the CPU 31, but is not transmitted outside the meter register 10.

The programming unit 33 must produce a predetermined sequence of signals on the DATA and CLOCK lines 34, 35 to properly signal the CPU 31 that the programming unit 33 is connected and that the changes in state are not due to external wiring. The programming unit 33 should timeout if a complete sequence is not completed, in the event that the connection to the programmer was terminated.

After the link between the programming unit 33 and the meter register 10 is established, the programming unit 33 sends a command instruction to program the meter register 10 or sends a command instruction for the meter register 10 to upload its accumulated meter consumption data. Communication sequences are performed in half duplex mode. The uploading or downloading of information should include repetition of data to insure that the information is valid. At the end of communication the programming units cease to provide power through the loop power (LOOP PWR) line 37 and the loop return (LOOP RET) line 38.

The following is the data that is sent during programming and retrieved during uploading. This data is stored in the non-volatile EPROM 47.

1. transaction identifier (type of transaction and type of system, i.e. upload, download,);
2. meter input resolution factor (value that represents incremental quantity that one input pulse represents)
3. preset totalization;
4. unit of measure (gallons, cubic feet, cubic meters, or imperial gallons);
5. meter identification (six digits for display 16 to uniquely represent a meter);
6. multiplier of totalization (0.001, 0.01, 0.1, 1, 10, 100, 1000 or 10,000);
7. meter type (turbo, disc, compound, propeller);
8. backflow totalization;
9. serial number;
10. scaled output pulse resolution (0.0001 to 9999 of 6-digit display);
11. time-out to zero (1.0 to 128 seconds, while checking the flow rate, which shows zero when no input counts are received);
12. time unit (0 or 1 representing flow rate in per minute or per hour);
13. scaled output pulse active/inactive;
14. unscaled output pulse active or inactive
15. normal meter direction (cw or ccw);
16. 20 mA set point (multiplier and calculation for flow rate display);
17. single phase input option;
18. debounce for external output; and
19. 4–20 milliamp active/inactive;
20. "no battery" option.

In the programming unit 33, the first screen provides a choice to either program the register unit 10 or to upload data from it. The programming unit 33 then goes on an appropriate sequence of data entry or screens to read the uploaded data.

The information that is sent to the meter register 10 and its CPU 31 is determined by the user, a software program in the programming unit 33 and a database of meter information. The transaction identifier and the checksum are automatically determined for the operation and data being transmitted.

The user will have pull down screens to select the metering pulse input device, such as the register 10, or a remote device, and to also select the individual meter type and size and the unit of measure. These three parameters determine the meter input resolution factor and the unit of measure. The selection of the meter automatically specifies the normal meter direction, single phase option, the 6-digit meter identification, and the meter type as listed in the database.

When either of these parameters is changed all the other displayed parameters should return to the default values in the database. The meter specific default values are scaled output resolution, totalization multiplier, 20 mA set point, time out to zero, and time unit. The default value of the scaled output resolution is dependent on the meter and the unit of measure. The 20 mA set point default is the maximum flow of the meter. The time out to zero is the time between pulses at 1% of maximum flow.

The time unit (minute or hour), totalization multiplier (0.001, 0.01, 0.1, 1, 10, 100, 1000, or 10,000) and time to zero are selected using pull-down screens. The scaled output resolution, preset totalization, and 20 mA setpoint are all controlled by boxes where a number is entered.

The scaled output resolution is listed with the chosen unit of measure. The scaled output resolution should be limited so that the frequency at the maximum meter flow is less than 3 Hz and the scaled output resolution is greater than or equal to the meter resolution factor. The 20 mA set point cannot be less than 25 percent of the maximum flow of the meter.

The time to zero is controlled by a pull-down screen that specifies the minimum displayed flow as a percentage of maximum flow. The minimum displayed flow is used to calculate a time between pulses. This is used as the time to zero number. The corresponding time to zero will never be less than one second.

There are also "check boxes" to enable the scaled pulse output, the unscaled pulse output, the 20 mA option, the preset totalization option and the time unit. When they are not checked the program fields for the scaled output resolution, 20 mA set point, and preset totalization are not shown.

The preset value is a six digit number field that will be the six digits on the totalization screen. The default for this field is always zero. The backflow is always set at zero during programming so it is not shown on the programming screen. The serial number is user-programmable.

In addition to the meters available in the database, a custom meter option is provided for other meters. This option would allow the user to select the options for meter direction, single phase input option, the meter type, the meter input resolution factor, debounce for external input, meter identification screen, and "no battery" option. Meter direction (cw or ccw), single phase input option, debounce for external input option are selected via "check boxes" and meter type (turbo, disc, prop or compound) is selected through a pull-down screen. The meter input resolution factor and the meter identification number are numeric digit fields.

The programming screen will also contain a button to "Program Transmitter" after the user has made the desired selections. The user should also have the ability to leave the programming sequence. When the actual programming is performed all the parameters should be saved to a file with a time and date stamp.

When the information is uploaded it should be displayed and saved to a file with a time and date stamp. The information is the same as the programming display with the addition of the backflow information. The backflow is a five digit number from the meter register 10. It is displayed with its corresponding multiplier and unit of measure.

The above has been a description of the detailed, preferred embodiments of the apparatus of the present invention. Various modifications to the details which are described above, which will be apparent to those of ordinary skill in the art, are included within the scope of the invention, as will become apparent from the following claims.

I claim:

1. A meter register for generating pulses representing units of flow in a water meter, the meter register comprising:
   a stored control program;
   a microelectronic CPU for executing the stored control program to read in pulses and transmit output data representing units of flow volume; and
   an output device responsive to output data transmitted from the CPU for indicating units of flow volume,
   wherein said microelectronic CPU processes a selectable meter input resolution factor by which the output signals that are transmitted to said output device are based on an absolute amount of flow per input signal according to a size of a corresponding one of a plurality of meters.

2. The meter register of claim 1, further comprising two magnetically switched sensors for positioning in proximity to a rotating magnetic element driven by the meter and having two north poles and two south poles which are rotated in proximity to said two magnetically switched sensors to produce at least two pulses per revolution of said magnetic element, such that two pulse trains are generated in response to a plurality of revolutions of said magnetic element with a phase of one of said two pulse trains leading a phase of a second one of the two pulse trains.

3. The meter register of claim 2, wherein said poles of said magnetic element are alternated between north and south poles and are spaced ninety angular degrees apart, and wherein said magnetically switched sensors are disposed one hundred and thirty-five angular degrees apart to detect one of a forward direction and a reverse direction of rotation of the rotating element.

4. The meter register of claim 1, further comprising two bidirectional serial data lines for operating in a first mode of operation for transmitting scaled and unscaled data, respectively, from said CPU, and wherein said CPU is responsive to sense the connection of a 4-to-20 milliamp external power source through at least one other line to switch to a second mode of operation to transmit and receive digital data with said external device with said two bidirectional serial data lines operating as clock and data lines for clock signals and data signals from said external device.

5. The meter register of claim 4, wherein the output device is a serial data output for connection to a second device.

6. The meter register of claim 4, wherein the output device is an electronic visual display.

7. The meter register of claim 1, further comprising a sealed transparent cover and a magnetically responsive switch electrically connected to the CPU and so positioned as to be responsive to movement of an external magnet over the sealed transparent cover, to cause the CPU to display a sequence of screen displays, on the electronic visual display.

8. The meter register of claim 7, wherein said screen displays include meter identification, totalization and diagnostic screen displays displayed in response to the movement of the magnet over the sealed transport cover.

9. The meter register of claim 8, wherein said sealed enclosure includes a glass crystal sealed with a glass-to-metal seal to other parts of the enclosure.

10. The meter register of claim 7, wherein the sequence of screen displays includes a forward flow totalization screen display and a reverse flow totalization screen display.

11. The meter register of claim 7, wherein the sequence of screen displays includes a scaled output resolution screen display and a scaled 4-to-20 milliamp output screen display.

12. The meter register of claim 7, wherein the sequence of screen displays includes a totalization screen display and a rate of flow screen display.

13. The meter register of claim 7, wherein the sequence of screen displays includes an alarm screen signifying a type of alarm.

14. A meter register for generating pulses in response to units of flow in a water meter, the meter register comprising:
   a microelectronic CPU for executing a stored control program to read in pulses and output data representing units of flow volume;
   an electronic visual display responsive to output data transmitted from the CPU for indicating units of flow volume; and
   a magnetically responsive switch electrically connected to the CPU and positioned for response to movement of an external magnet that is moved over a top of the meter register, to cause the CPU to display a sequence of screen displays, on the electronic visual display.

15. The meter register of claim 14, wherein said screen displays include meter identification, totalization and diagnostic screen displays displayed in response to the movement of the magnet over the sealed transparent cover.

16. The meter register of claim 15, wherein said sealed enclosure includes a glass crystal sealed with a glass-to-metal seal to other parts of the enclosure.

17. The meter register of claim 14, wherein the sequence of screen displays includes a forward flow totalization screen display and a reverse flow totalization screen display.

18. The meter register of claim 14, wherein the sequence of screen displays includes a scaled output resolution screen display and a scaled 4-to-20 milliamp output screen display.

19. The meter register of claim 14, wherein the sequence of screen displays includes a totalization screen display and a rate of flow screen display.

20. The meter register of claim 14, wherein the sequence of screen displays includes an alarm screen signifying a type of alarm.

21. A meter register for generating pulses generated in response to units of flow in a water meter, the meter register comprising:
   a microelectronic CPU for reading in pulses and transmitting output data representing units of flow volume,
   a data port connected to two bidirectional serial data lines for operating in a first mode of operation for transmitting scaled and unscaled data, respectively, from the CPU to an external unit other than a visual display or an RS-232 serial data port and for receiving data from the external unit, and
   wherein said CPU is responsive to sense the connection of an external power source through at least one other line to switch to a second mode of operation to transmit and receive data with said external unit with said two bidirectional serial data lines operating as clock and data lines.

22. The meter register of claim 21, further comprising an electronic visual display responsive to output data transmitted from the CPU for indicating units of flow volume.

23. The meter register of claim 21, wherein said microelectronic CPU receives a selectable meter input resolution factor as data from said external unit through said data port for a corresponding one of several meters by which the output signals that are transmitted to said visual display are based on an absolute amount of flow per input signal according to a size of a corresponding one of a plurality of meters.

24. A meter register for generating pulses representing units of flow in a water meter, the meter register comprising:
   a stored control program;
   a microelectronic CPU for executing the stored control program to read in pulses and transmit output data representing units of flow volume;
   an output device responsive to output data transmitted from the CPU for indicating units of flow volume; and
   a data port in electrical communication with the microelectronic CPU for communicating programming data to the microelectronic CPU and for transmitting output data representing units of flow volume from the CPU,
   wherein said microelectronic CPU processes a programmable meter input resolution factor as data from an external device for a corresponding one of several meters by which the output signals that are transmitted to said output device are based on an absolute amount of flow per input signal according to a size of a corresponding one of a plurality of meters.

25. The meter register of claim 24, further comprising two magnetically switched sensors for positioning in proximity to a rotating magnetic element driven by the meter and having two north poles and two south poles which are rotated in proximity to said two magnetically switched sensors.

26. The meter register of claim 25, wherein said poles of said magnetic element are alternated between north and south poles and are spaced ninety angular degrees apart; and wherein said magnetically switched sensors are disposed one of a forward direction and a reverse direction of rotation of the rotating element.

27. The meter register of claim 24, wherein said data port includes two bidirectional serial data lines for operating in a first mode of operation for transmitting the units of flow volume from the CPU as scaled and unscaled data, respectively,; and
   wherein said CPU is responsive to sense the connection of a 4-to-20 milliamp external power source through at least one other line to switch to a second mode of operation to receive said programming data from an external device through said data port on said bidirectional lines.

28. The meter register of claim 24, wherein the output device is a serial data output for connection to an external device.

29. The meter register of claim 24, wherein the output device is an electronic visual display.

30. The meter register of claim 29, further comprising a magnetically responsive switch electrically connected to the CPU and positioned for response to movement of an external magnet over a top of the meter register to cause the CPU to display a sequence of screen displays on the electronic visual display.

31. The meter register of claim 30, wherein said meter register is housed in a sealed enclosure; and wherein said magnetically responsive switch is disposed inside said sealed enclosure.

32. The meter register of claim 31, wherein said sealed enclosure includes a glass crystal sealed with a glass-to-metal seal to other parts of the enclosure.

33. The meter register of claim 30, wherein the sequence of screen displays includes a forward flow totalization screen display and a reverse flow totalization screen display.

34. The meter register of claim 30, wherein the sequence of screen displays includes a scaled output resolution screen display and a scaled 4-to-20 milliamp output screen display.

35. The meter register of claim 30, wherein the sequence of screen displays includes a totalization screen display and a rate of flow screen display.

36. The meter register of claim 30, wherein the sequence of screen displays includes an alarm screen signifying a type of alarm.

* * * * *

UNITED STATES PATENT AND TRADEMARK OFFICE
CERTIFICATE OF CORRECTION

PATENT NO.   : 6,611,769 B2
DATED        : August 26, 2003
INVENTOR(S)  : John A. Olson It is certified that error appears in the above-identified patent and that said Letters Patent is hereby corrected as shown below:

Column 12,
Line 62, "second device" should be -- second external device --.

Column 13,
Line 7, "transport" should be -- transparent --.

Column 14,
Line 51, "one of" should be -- one hundred and thirty-five angular degrees apart to detect one of --.

Signed and Sealed this

Fourth Day of January, 2005

JON W. DUDAS
*Director of the United States Patent and Trademark Office*